Sept. 17, 1929.   T. C. PIKE   1,728,250
PIPE PATCH
Filed July 26, 1927
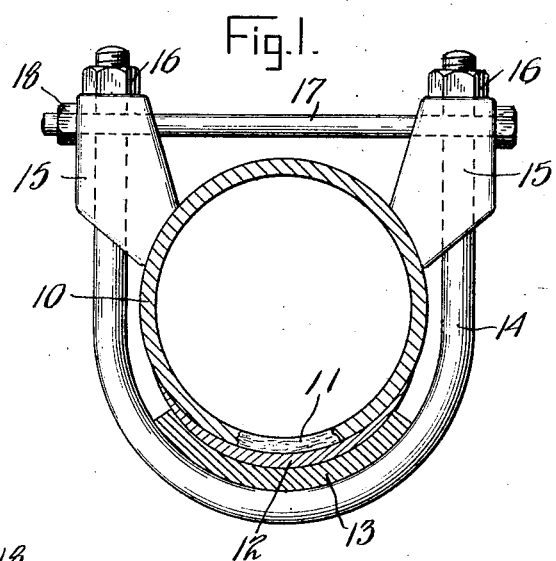
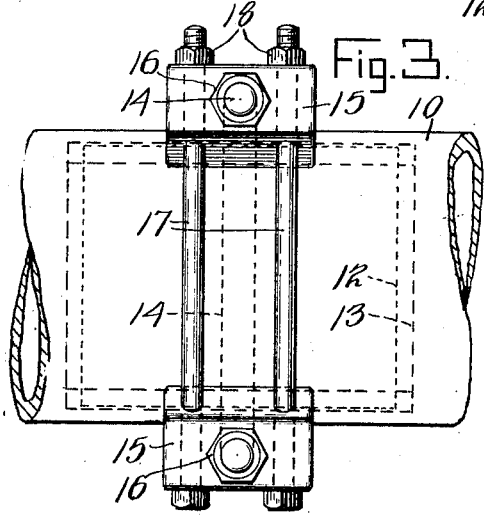
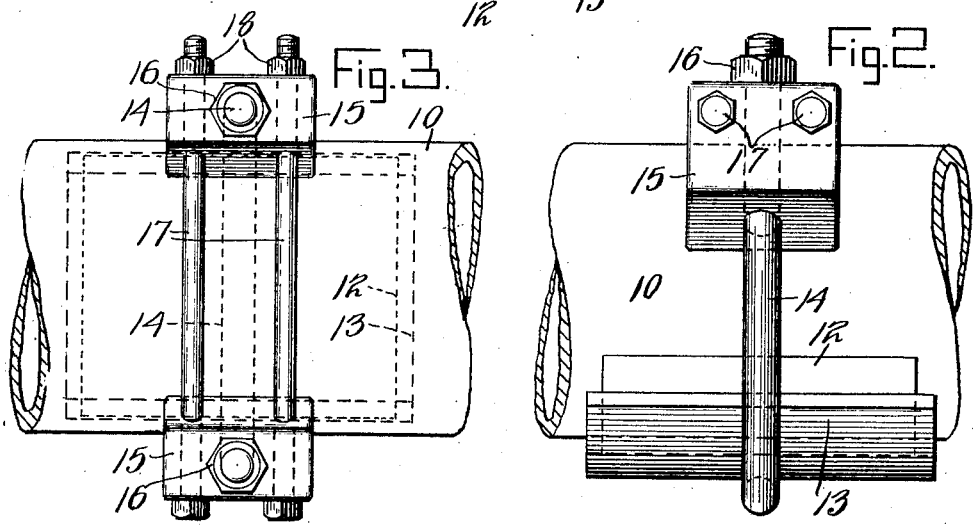
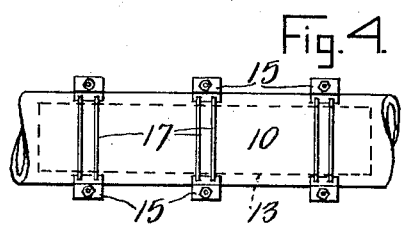
Inventor
Thomas C. Pike
By
Attorney Patented Sept. 17, 1929

1,728,250

UNITED STATES PATENT OFFICE

THOMAS C. PIKE, OF BLUFFTON, INDIANA, ASSIGNOR TO THE GEO. W. GRIMES CO., OF BLUFFTON, INDIANA, A CORPORATION

PIPE PATCH

Application filed July 26, 1927. Serial No. 208,648.

This invention relates to pipe patching devices of the kind that employ substantially U-shaped straps or rods bent around the pipe and joined at the ends by a yoke.

The object of the invention is to provide a device for patching holes or cracks in iron or cement pipes or the like to provide against leaks.

In devices heretofore used in the repair of pipes in a trench it was necessary to make a very large or wide trench at the place of the leak in order to manipulate the wrenches etc. necessary to attach the device. With the use of my device a trench need be only slightly larger than the pipe. The former devices also were heavy and expensive. My device is relatively light and inexpensive to make.

Another object of my invention is to provide a device that may be adapted for use on pipes of different sizes by the use of different size patches only. Further objects will become apparent as the description proceeds.

Referring to the accompanying drawings which are made a part hereof and on which similar reference characters indicate similar parts, Figure 1 is an end elevation of the device showing the pipe in section, Figure 2, a side elevation, Figure 3, a plan view, and Figure 4, a view showing a plurality of clamps to provide for a long patch.

In the drawings reference character 10 indicates a pipe having a crack or break at 11. 12 indicates a packing patch which is held against the pipe by a clamp member 13 which is arcuate in cross section to conform to the shape of the pipe to be patched. As shown, the packing member 12 is crescent shaped in cross section. This gives a better result but is not essential as a packing material of uniform thickness throughout would give good results.

A U-shaped member 14 formed of a rod or band secures the clamp 13 against the packing material. The upper ends of this member pass through blocks 15 and have nuts 16 thereon for tightening the U-shaped member against the clamp. Cross rods 17 pass through the blocks 15 at right angles to the upper ends of the rods 14 and have nuts 18 thereon for tightening the blocks 15 against the sides of the pipe 10. The inner ends of the blocks 15 are concaved to fit the cylindrical surface of the pipe. In practice one set of blocks 15 may be used with pipes of different sizes. For example, I preferably use one set of blocks 15 with a pipe 3, 4 and 5 inches in diameter, another set of blocks for a pipe from 6 to 8 inches, and another for a pipe 9 to 12 inches. As shown in Figs. 1 and 2, I use one U bolt 14 and two cross bolts 17. Obviously, I could use two U bolts 14 and one bolt 17 with equally good results.

The use of the device is believed to be clear.

In employing the device, the packing material 12 is applied to the pipe at the place of the leak or crack. The clamp plate 13 is applied upon the packing material and the U member placed around the pipe. As the nuts 16 and 18 are tightened the blocks 15 are drawn against the sides of the pipe and the clamp 13 is drawn against the packing material to provide a secure packing. The use of bolts 17 and 14 allow the U to conform to any size pipe. For a larger pipe the blocks 15 are allowed to slide further down around the pipe.

Figure 4 shows a plurality of U-members used with a long patching clamp.

It will be obvious to those skilled in the art that various changes may be made in my device without departing from the spirit of the invention, and I, therefore, do not limit myself to what is shown in the drawings and described in the specification, but only as set forth in the appended claims.

Having thus fully described my said invention, what I claim as new and desire to secure by Letters Patent, is:

1. A pipe patch comprising a U-clamp adapted to fit around a pipe and having legs of a length to project beyond the pipe, a substantially straight cross member connecting the extremities of the U-clamp and mounted so that the distance from the straight cross member to the mid-portion of the U-clamp is slightly greater than the distance between the legs of the U-clamp, blocks for receiving the end portions of the U-clamp and cross member substantially at right angles to each other, said blocks extending radially inward and being provided with curved pipe engaging surfaces, and means for advancing the blocks on the respective members for forcing the same radially inward into engagement with the surface of the pipe, substantially as set forth.

2. A pipe patch comprising a clamp having a pair of substantially straight side portions and a curved mid-portion, a substantially straight cross member connecting the extremities of the side portions, said side portions being of a length sufficient to space the cross member from the curved mid-portion a distance slightly greater than the space between the straight portions of the clamp, blocks disposed inwardly of the joint between the clamp and cross member and arranged to be forced against the surface of the enclosed pipe substantially radially of the same, substantially as set forth.

In witness whereof, I have hereunto set my hand at Bluffton, Indiana, this 21st day of July, A. D. nineteen hundred and twenty-seven.

THOMAS C. PIKE.